United States Patent
Jerabek et al.

(10) Patent No.: US 10,174,189 B2
(45) Date of Patent: Jan. 8, 2019

(54) FIBER REINFORCED COMPOSITE

(71) Applicant: BOREALIS AG, Vienna (AT)

(72) Inventors: Michael Jerabek, Leonding (AT); Wolfgang Stockreiter, Puchenau (AT); Thomas Lummerstorfer, Gramastetten (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/742,133

(22) PCT Filed: Jul. 13, 2016

(86) PCT No.: PCT/EP2016/066665
§ 371 (c)(1),
(2) Date: Jan. 5, 2018

(87) PCT Pub. No.: WO2017/009380
PCT Pub. Date: Jan. 19, 2017

(65) Prior Publication Data
US 2018/0201768 A1    Jul. 19, 2018

(30) Foreign Application Priority Data

Jul. 14, 2015 (EP) .................................. 15176672

(51) Int. Cl.
| C08L 23/12 | (2006.01) |
| C08K 7/14 | (2006.01) |
| C08L 23/14 | (2006.01) |
| C08J 5/04 | (2006.01) |
| C08J 5/10 | (2006.01) |
| C08J 5/18 | (2006.01) |

(52) U.S. Cl.
CPC .............. *C08L 23/12* (2013.01); *C08J 5/043* (2013.01); *C08J 5/10* (2013.01); *C08J 5/18* (2013.01); *C08K 7/14* (2013.01); *C08L 23/142* (2013.01); *C08J 2323/12* (2013.01); *C08J 2423/12* (2013.01); *C08J 2423/26* (2013.01); *C08L 2205/025* (2013.01); *C08L 2205/035* (2013.01); *C08L 2205/06* (2013.01); *C08L 2207/00* (2013.01)

(58) Field of Classification Search
CPC ................. C08L 23/12; C08L 2205/06; C08L 2205/025; C08L 2205/035; C08L 2207/00; C08J 5/18; C08J 5/043; C08J 5/10; C08J 2423/12; C08J 2423/26; C08J 2323/12

See application file for complete search history.

(56) References Cited

U.S. PATENT DOCUMENTS

| 3,940,379 A | 2/1976 | Castagna et al. |
| 4,282,076 A | 8/1981 | Boynton |
| 4,951,589 A | 8/1990 | Pfeffer |
| 5,250,631 A | 10/1993 | McCullough, Jr. |
| 2007/0160860 A1* | 7/2007 | Fiscus .................. B32B 27/32 428/516 |
| 2010/0069560 A1* | 3/2010 | Masarati ................ C08L 23/10 524/502 |
| 2013/0281630 A1* | 10/2013 | Leskinen .............. C08F 210/06 525/240 |

FOREIGN PATENT DOCUMENTS

| EP | 0 320 150 | 11/1988 |
| EP | 0 462 574 | 6/1991 |
| EP | 0 480 190 | 4/1992 |
| EP | 0 572 028 | 12/1993 |
| EP | 0 622 380 | 4/1994 |
| EP | 1 538 167 | 8/2003 |
| EP | 1 783 145 | 6/2005 |
| WO | 99/24478 | 11/1998 |
| WO | 99/24479 | 11/1998 |
| WO | 00/68315 | 5/2000 |
| WO | 01/48041 | 7/2001 |
| WO | 02/096986 | 12/2002 |
| WO | 2004/113438 | 12/2004 |
| WO | 2007/140019 | 6/2007 |
| WO | 2008/074713 | 6/2008 |
| WO | 2008/074715 | 6/2008 |
| WO | 2014/033017 | 3/2014 |

OTHER PUBLICATIONS

Busico, et al., "Microstructure of polypropylene," Progress in Polymer Science, 2001, vol. 26 pp. 443-533, Elsevier Science Ltd.

Busico, et al., "Alk-l-ene Polymerization in the Presence of a Monocyclopentadienyl Zirconium(iv) Acetamidinate Catalyst: Microstructural and Mechanistic Insightsa," Macromolecular Journals, 2007, vol. 28, pp. 1128-1134, Wiley-VCH Verlag GmbH & Co. KGaA, Weinheim.

Busico, et al., "Full Assignment of the 13C NMR Spectra of Regioregular Polypropylenes: Methyl and Methylene Region," Macromolecules, 1997, vol. 30, pp. 6251-6263, American Chemical Society.

Cheng, H.N., "13C NMR Analysis of Ethylene-Propylene Rubbers," Macromolecules, 1984, vol. 17, No. 10, pp. 1950-1955, American Chemical Society.

European Search Report for Application No. 15176672.2-1302 dated Dec. 23, 2016, 5 pgs.

Frank, S., et al., "New measurement method for appearance of flow marks or tiger stripes defect for improved quantification and analysis," SPIE vol. 6831, 2 pgs.

Zweifel, H., et al., "Solubility of Additives in Polymers," Plastics Additives Handbook, 6th Edition, 2009, pp. 1141-1190, Hanser Publishers, Munich.

International Search Report and the Written Opinion of the International Searching Authority, or the Declaration for Application No. PCT/EP2016/066665, dated Sep. 14, 2016, 9 pgs.

Resconi, et al., "Selectivity in Propene Polymerization with Metallocene Catalysts," Chemical Reviews, 2000, vol. 100, pp. 1253-1345, American Chemical Society.

(Continued)

Primary Examiner — Robert S Jones
(74) Attorney, Agent, or Firm — Lowenstein Sandler LLP

(57) ABSTRACT

Fiber reinforced composite comprising a trimodal polypropylene composition.

17 Claims, 1 Drawing Sheet

(56) References Cited

OTHER PUBLICATIONS

Sybille, et al., "New measurement method for appearance of flow marks or tiger stripes defect for improved quantification and analysis," 25th annual meeting of the Polymer Processing Socienty, 2009, 10 pgs., Borealis.

Wang, et al., "Structural Analysis of Ethylene/Propylene Copolymers Synthesized with a Constrained Geometry Catalyst," Macromolecules, 2000, vol. 33, pp. 1157-1162, American Chemical Society.

Zhou, et al., "A new decoupling method for accurate quantification of polyethylene copolymer composition and triad sequence distribution with 13C NMR," Journal of Magnetic Resonance, 2007, vol. 187, pp. 225-233, Elsevier.

Zweifel, et al., "Nucleating Agents for Semi-crystalline Polymers," Plastics Additives Handbook, 6th Edition, 2009, pp. 966-990, Hanser Publishers, Munich.

\* cited by examiner

FIBER REINFORCED COMPOSITE

CROSS-REFERENCE TO RELATED APPLICATION(S)

This application is a national phase of International Application No. PCT/EP2016/066665, filed on Jul. 13, 2016, which claims the benefit of European Patent Application No. 15176672.2, filed on Jul. 14, 2015. The contents of these applications are hereby incorporated by reference in their entirety.

The present invention is directed to a new fiber reinforced composite comprising a polypropylene composition containing at least three polypropylenes which differ in the molecular weight. The present invention is also directed to injection molded articles comprising said new fiber reinforced composite.

Typically in fiber reinforced composites the mechanical performance, like stiffness and strength, is adjusted with the fiber content. Increasing fiber content leads to increase of stiffness and strength. A problem connected with high loads of fibers is that the average fiber length decreases with fiber content. The base resin viscosity at processing temperatures determines the magnitude of local shear forces responsible for fiber breakage. In other words easy-to-flow materials would prevent fiber breakage; however they have the drawback that the mechanical properties of the final composite containing such materials are poor.

Further in fiber reinforced composites the surface quality is an important aspect, especially in the automotive industry. Normally the surface quality decreases with increasing glass fiber content due to the increasing ratio of solid components in the melt which creates the characteristic rough and mat surface.

Thus, the object of the present invention is to create a composite with balanced property profile, i.e. high stiffness and strength in combination with good processability and excellent surface appearance.

The finding of the present invention is to provide a fiber reinforced composite with a fiber (F) content of at least 35 wt.-% and a polypropylene composition which contains at least three polypropylenes with different molecular weight.

Thus the present invention is directed to a fiber reinforced composite comprising
  (a) a polypropylene composition (PPC),
  (b) fibers (F),
  (c) a polar modified polypropylene as adhesion promotor (AP),
wherein said polypropylene composition (PPC) comprises at least three semicrystalline polypropylenes (PP1), (PP2), (PP3), which differ in their melt flow rate $MFR_2$ (230° C.) measured according to ISO 1133, preferably
  (a1) said semicrystalline polypropylene (PP1) has a melt flow rate $MFR_2$ (230° C.) measured according to ISO 1133 in the range of 1.0 to 60 g/10 min, and
  (a2) said semicrystalline polypropylene (PP2) hast a melt flow rate $MFR_2$ (230° C.) measured according to ISO 1133 in the range of 40 to 120 g/10 min, and
  (a3) said semicrystalline polypropylene (PP3) hast a melt flow rate $MFR_2$ (230° C.) measured according to ISO 1133 in the range of 180 to 1,000 g/10 min,
with the proviso that the melt flow rate $MFR_2$ (230° C.) of the semicrystalline polypropylene (PP1) is lower than the melt flow rate $MFR_2$ (230° C.) of the semicrystalline polypropylene (PP2).

Preferably the weight ratio between the fibers (F) and the polypropylene composition (PPC) [(F)/(PPC)] is in the range of 0.7 to 2.0, preferably with the proviso that the sum of the fibers (F) and the polypropylene composition (PPC) in the fiber reinforced composite is at least 80 wt.-% based on the total weight of the fiber reinforced composite.

Preferably the weight ratio between the fibers (F) and the polar modified polypropylene is in the range of 10 to 50.

More preferably, the present invention is directed to a fiber reinforced composite comprising
  (a) 29.0 to 60.0 wt.-%, like 29.5 to 60.0 wt.-%, based on the fiber reinforced composite, of a polypropylene composition (PPC),
  (b) 39.0 to 70.0 wt.-%, like 39.5 to 70.0 wt.-%, based on the fiber reinforced composite, of fibers (F),
  (c) 0.5 to 5.0 wt.-%, based on the fiber reinforced composite, of a polar modified polypropylene as adhesion promotor (AP), wherein said polypropylene composition (PPC) comprises at least three semicrystalline polypropylenes (PP1), (PP2), (PP3),
  (a1) said semicrystalline polypropylene (PP1) hast a melt flow rate $MFR_2$ (230° C.) measured according to ISO 1133 in the range of 1.0 to 60.0 g/10 min, preferably in the range of 1.0 to 55 g/10 min,
  (a2) said semicrystalline polypropylene (PP2) hast a melt flow rate $MFR_2$ (230° C.) measured according to ISO 1133 in the range of 40.0 to 120 g/10 min, preferably in the range of 56 to 120 g/10 min, and
  (a3) said semicrystalline polypropylene (PP3) hast a melt flow rate $MFR_2$ (230° C.) measured according to ISO 1133 in the range of 180 to 1,000 g/10 min, with the proviso that the melt flow rate $MFR_2$ (230° C.) of the semicrystalline polypropylene (PP1) is lower than the melt flow rate $MFR_2$ (230° C.) of the semicrystalline polypropylene (PP2).

In a preferred embodiment the polypropylene composition (PPC) is α-nucleated.

Further it is preferred that the fiber reinforced composite has a melt flow rate $MFR_2$ (230° C.) measured according to ISO 1133 in the range of 1.5 to 10.0 g/10 min.

Additionally it is preferred that the polypropylene composition (PPC) has a melt flow rate $MFR_2$ (230° C.) measured according to ISO 1133 in the range of 25 to 165 g/10 min.

Still more preferably the weight ratio between the semicrystalline polypropylene (PP2) and the sum of the semicrystalline polypropylenes (PP1) and (PP3) [(PP2)/((PP1)+(PP3))] is in the range of 0.4 to 3.0.

Additionally or alternatively to the previous paragraph, the weight ratio between the semicrystalline polypropylene (PP3) and the semicrystalline polypropylenes (PP1) [(PP3)/(PP1)] is preferably in the range of 0.5 to 4.0.

In one specific embodiment the polypropylene composition (PPC) is monophasic.

In a further preferred embodiment the semicrystalline polypropylenes (PP1), (PP2), (PP3) are propylene homopolymers (H-PP1), (H-PP2), (H-PP3). Yet more preferably the polypropylene composition (PPC) is monophasic and the semicrystalline polypropylenes (PP1), (PP2), (PP3) are propylene homopolymers (H-PP1), (H-PP2), (H-PP3).

In another preferred embodiment the semicrystalline polypropylene (PP2) and (PP3) are propylene homopolymers (H-PP2) and (H-PP3), whereas the semicrystalline polypropylene (PP1) is a propylene copolymer (R-PP1).

Preferably the fibers (F) are selected from the group consisting of glass fibers, metal fibers, ceramic fibers, carbon fibers and graphite fibers, still more preferably the fibers (F) are glass fibers.

In a preferred embodiment, the average diameter of the fibers (F) is in the range of 5.0 to 20.0 μm.

Yet more preferably the average length of the fibers (F) is in the range of 2 to 8 mm.

The adhesion promotor (AP) is preferably a maleic anhydride functionalized polypropylene.

The invention is also directed to an injection molded article, more preferably to an injection molded automotive article, comprising the fiber reinforced composite as defined in the instant invention.

Figure 1:
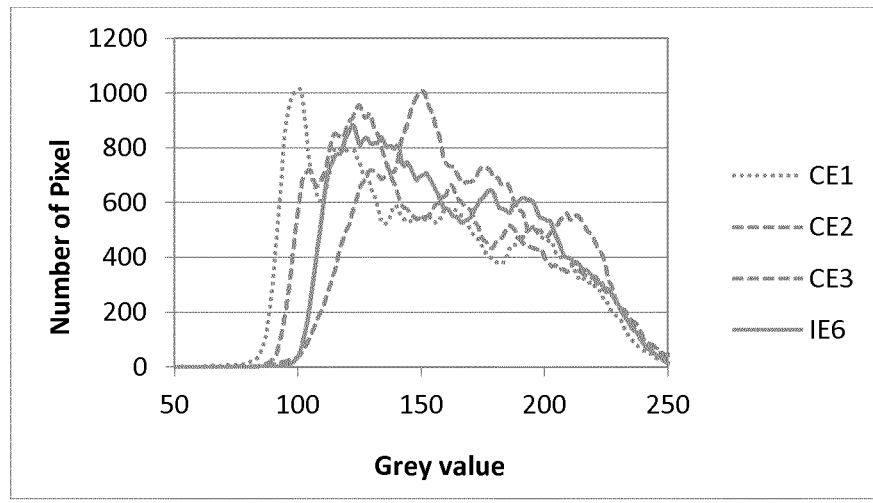
FIG. 1 is a diagram of the number of pixels as a function of the grey value determined on 210×148×3 mm3 evaluation plaques made of the compositions according to examples CE1, CE2, CE3 and 1E6.
Figure 2:
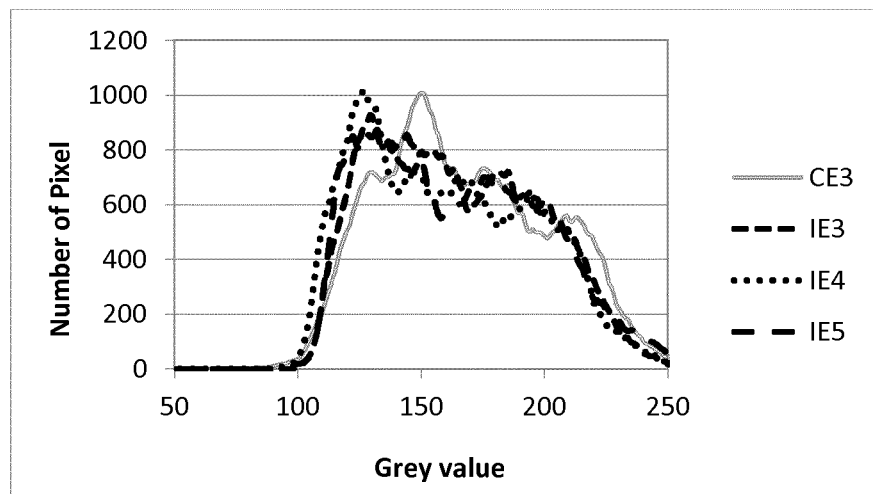
FIG. 2 is a diagram of the number of pixels as a function of the grey value determined on 210×148×3 mm3 evaluation plaques made of the compositions according to examples CE3, IE3; IE4 and IE5.

In the following the invention will be described in more detail.

The Fiber Reinforced Composite

As mentioned above the fiber reinforced composite comprises a polypropylene composition (PPC), fibers (F) and a polar modified polypropylene as adhesion promotor (AP). In a preferred embodiment the polypropylene composition (PPC), the fibers (F) and the polar modified polypropylene (AP) make up the main part of the fiber reinforced composite. That is in one preferred embodiment the fiber reinforced composite comprises the polypropylene composition (PPC), the fibers (F) and the polar modified polypropylene (AP), wherein the polypropylene composition (PPC) and the polar modified polypropylene (AP) are the main polymer components in the fiber reinforced composite, i.e. the fiber reinforced composite does not contain more than 10 wt.-%, preferably not more than 5 wt.-%, based on the total amount of all polymers of the fiber reinforced composite, of polymers other than the polypropylene composition (PPC) and the polar modified polypropylene (AP). Such additional polymers can be for instance polymeric carriers for additives (AD). Accordingly in one specific embodiment the fiber reinforced composite consists of the polypropylene composition (PPC), the fibers (F), the polar modified polypropylene (AP) and additives (AD) including their polymeric carriers.

It should be noted that present invention is especially directed to fiber reinforced composite in which the polypropylene composition (PPC) forms a continuous phase being the matrix for the fibers (F). Accordingly it is preferred that the complete polymer contained in the fiber reinforced composite forms a continuous phase being the matrix of the fiber reinforced composite. It is apparent from the wording "the complete polymer contained in the reinforced composition forms a continuous phase being the matrix of the fiber reinforced composite" that present invention is preferably directed to fiber reinforced composite in which the polymer phase forms a continuous phase being the matrix for the fibers. Hence, the polymer forming the matrix, i.e. the polypropylene composition (PPC), for the fibers in the composite is monophasic. The desired mechanical properties of the fiber reinforced composite are hence essentially controlled by the polypropylene composition (PPC) in combination with the adhesion promoter (AP) improving the adhesion and insertion of the fibers (F). It is believed that the polypropylene composition (PPC) of such composite forms a continuous phase. Further insertions of elastomer phases aiming to improve the same mechanical properties are preferably excluded.

Accordingly in one preferred embodiment the weight ratio between the fibers (F) and the polypropylene composition (PPC) [(F)/(PPC)] is in the range of 0.6 to 2.5, like 0.6 to 2.0, more preferably in the range of 0.8 to 2.6, yet more preferably in the range of 0.9 to 2.4, like in the range of 1.0 to 2.2, preferably with the proviso that the sum of the fibers (F) and the polypropylene composition (PPC) in the fiber reinforced composite is at least 80 wt.-%, more preferably at least 85 wt.-%, still more preferably at least 90 wt.-%, still yet more preferably at least 95 wt.-%, like at least 96 wt.-%, based on the total weight of the fiber reinforced composite.

Preferably the weight ratio between the fibers (F) and the polar modified polypropylene is in the range of 10 to 50, more preferably in the range of 15 to 40, yet more preferably in the range of 20 to 30, like in the range of 22 to 28.

Additionally or alternatively to the previous paragraph the fiber reinforced composite preferably comprises
  (a) 29.0 to 60.0 wt.-%, more preferably 38.0 to 57.0 wt.-%, yet more preferably 42.5 to 53.5 wt.-%, like 45.0 to 50.2 wt.-%, based on the fiber reinforced composite, of a polypropylene composition (PPC),
  (b) 39.0 to 70.0 wt.-%, more preferably 42.0. to 60.0 wt.-%, yet more preferably 45.0 to 55.0 wt.-%, like 48.0 to 52.0 wt.-%, based on the fiber reinforced composite, of fibers (F), and
  (c) 0.5 to 5.0 wt.-%, more preferably 1.0 to 4.0 wt.-%, yet more preferably 1.5 to 3.5 wt.-%, like 1.8 to 2.2 wt.-%, based on the fiber reinforced composite, of a polar modified polypropylene as adhesion promotor (AP).

In still another preferred embodiment the fiber reinforced composite comprises, preferably consists of,
  (a) 29.0 to 60.0 wt.-%, more preferably 38.0 to 57.0 wt.-%, yet more preferably 42.5 to 52.5 wt.-%, like 45.0 to 49.0 wt.-%, based on the fiber reinforced composite, of a polypropylene composition (PPC),
  (b) 39.0 to 70.0 wt.-%, more preferably 41.0. to 60.0 wt.-%, yet more preferably 45.0 to 55.0 wt.-%, like 48.0 to 52.0 wt.-%, based on the fiber reinforced composite, of fibers (F),
  (c) 0.5 to 5.0 wt.-%, more preferably 1.0 to 4.0 wt.-%, yet more preferably 1.5 to 3.5 wt.-%, like 1.8 to 2.2 wt.-%, based on the fiber reinforced composite, of a polar modified polypropylene as adhesion promotor (AP), and
  (d) 0.5 to 8.0 wt.-%, more preferably 1.0 to 5.0 wt.-%, yet more preferably 1.0 to 3.5 wt.-%, like 1.2 to 3.0 wt.-%, based on the fiber reinforced composite, additives (AD).

It is preferred that the polypropylene composition (PPC), the fibers (F), the polar modified polypropylene as adhesion promotor (AP), the optional α-nucleating agent (see discussion below) and the optional additives (AD) make up the main part of the fiber reinforced composition. Accordingly in one preferred embodiment the polypropylene composition (PPC), the fibers (F), the polar modified polypropylene as adhesion promotor (AP), the optional α-nucleating agent and the optional additives (AD) make up at least 70 wt.-%, more preferably at least 80 wt.-%, more preferably at least 90 wt.-%, yet more preferably at least 95 wt.-%, like at least 99 wt.-%, of the fiber reinforced composition. In an especially preferred embodiment the fiber reinforced composite consists of the polypropylene composition (PPC), the fibers (F), the polar modified polypropylene (AP), the optional α-nucleating agent and the optional additives (AD).

Preferably the fiber reinforced composite has a melt flow rate $MFR_2$ (230° C.) measured according to ISO 1133 in the range of 1.0 to 10.0 g/10 min, more preferably in the range of 1.5 to 8.0 g/10 min, like in the range of 1.5 to 7.0 g/10 min.

Still more preferably the fiber reinforced composite has
(a) tensile modulus measured according to ISO 527-2 of at least 11,000 MPa, more preferably in the range of 11,000 to 15,000 MPa, like in the range of 12,000 to 14,500 MPa,
and/or
(b) tensile strength measured according to ISO 527-2 of at least 125 MPa, more preferably in the range of 125 to 180 MPa, like in the range of 130 to 170 MPa.

Preferably the fiber reinforced composite has a notched impact strength measured according to ISO 179 1 eA (23° C.) of at least 10 kJ/m², more preferably in the range of 10.0 to 20.0 kJ/m², yet more preferably in the range of 12.0 to 18.0 kJ/m².

In the following the individual components of the fiber reinforced composite will be described in more detail.

The Polypropylene Composition (PPC)

The polypropylene composition (PPC) according to this invention must comprise at least three semicrystalline polypropylenes (PP1), (PP2), (PP3) which differ in their melt flow rate $MFR_2$ (230° C.).

The term "semicrystalline" indicates that the polymer is not amorphous. Accordingly it is preferred that the semicrystalline polypropylene according to this invention has a xylene soluble fraction (XCS) of not more than 10 wt.-%, in case of a semicrystalline propylene homopolymer the xylene soluble fraction (XCS) is even lower, i.e. not more than 6.0 wt.

Preferably the semicrystalline polypropylene according to this invention has a melting temperature Tm above 135° C., more preferably above 140° C. In case of a semicrystalline propylene homopolymer the melting temperature Tm is above 150° C., like at least 156° C. Upper ranges are not more than 168° C., like not more than 165° C.

Preferably the polypropylene composition (PPC) is α-nucleated, i.e. comprises a α-nucleating agent. More preferably the polypropylene composition (PPC) is free of β-nucleating agents. The α-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and
(iv) vinylcycloalkane polymer or vinylalkane polymer, and
(v) mixtures thereof.

Such nucleating agents are commercially available and are described, for example, in "Plastic Additives Handbook", 5th edition, 2001 of Hans Zweifel (pages 967 to 990).

The α-nucleating agent content of the polypropylene composition (PPC) is preferably up to 5.0 wt.-%. In a preferred embodiment, the polypropylene composition (PPC) contains not more than 3000 ppm, more preferably of 1 to 2000 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, hydroxybis (2,4,8,10-tetra-tert. butyl-6-hydroxy-12H-dibenzo(d,g)(1,3,2) dioxaphosphocin 6-oxidato) aluminium, like NA21, vinylcycloalkane polymer, vinylalkane polymer, and mixtures thereof.

Preferably the α-nucleating agent comprised in the polypropylene composition (PPC) is vinylcycloalkane polymer and/or vinylalkane polymer, more preferably vinylcycloalkane polymer, like vinylcyclohexane polymer (polyVCH). Vinyl cyclohexane polymer (polyVCH) is particularly preferred as α-nucleating agent. It is appreciated that the amount of vinylcycloalkane, like vinylcyclohexane polymer (polyVCH) and/or vinylalkane polymer, more preferably of vinylcyclohexane polymer (polyVCH), in the polypropylene composition (PPC) is not more than 500 ppm, preferably not more than 200 ppm, more preferably not more than 100 ppm, like in the range of 0.1 to 500 ppm, preferably in the range of 0.5 to 200 ppm, more preferably in the range of 1.0 to 100 ppm. Furthermore, it is appreciated that the vinylcycloalkane polymer and/or vinylalkane polymer is introduced into the polypropylene composition (PPC) by the BNT technology, i.e. due to the production of one or more of the semicrystalline polypropylenes (PP1), (PP2), (PP3). With regard to the BNT-technology reference is made to the international applications WO 99/24478, WO 99/24479 and particularly WO 00/68315. According to this technology a catalyst system, preferably a Ziegler-Natta procatalyst or metallocene catalyst, can be modified by polymerizing a vinyl compound in the presence of the catalyst system, which vinyl compound has the formula:

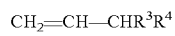

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of one or more of the semicrystalline polypropylenes (PP1), (PP2), (PP3). The polymerized vinyl compound acts as an α-nucleating agent. The weight ratio of vinyl compound to solid catalyst component in the modification step of the catalyst is preferably of up to 5 (5:1), more preferably up to 3 (3:1), like in the range of 0.5 (1:2) to 2 (2:1).

Preferably the polypropylene composition (PPC) comprises at least three semicrystalline polypropylenes (PP1), (PP2), (PP3). More preferably the three semicrystalline polypropylenes (PP1), (PP2), (PP3) are the only semicrystalline polypropylenes in the polypropylene composition (PPC).

The three semicrystalline polypropylenes (PP1), (PP2), (PP3) must differ in their melt flow rate $MFR_2$ (230° C.).

Accordingly it is preferred that
(a) the ratio of the melt flow rate $MFR_2$ (230° C.) of the semicrystalline polypropylene (PP2) to the melt flow rate $MFR_2$ (230° C.) of the semicrystalline polypropylene (PP1) [$MFR_2$(PP2)/$MFR_2$(PP1)] is in the range of 1.5 to 40.0, more preferably in the range of 2.0 to 30.0, yet more preferably in the range of 2.5 to 25.0, still more preferably in the range of 3.0 to 15.0, like in the range of 3.0 to 10.0, and
(b) the ratio of the melt flow rate $MFR_2$ (230° C.) of the semicrystalline polypropylene (PP3) to the melt flow rate $MFR_2$ (230° C.) of the semicrystalline polypropylene (PP2) [$MFR_2$(PP3)/$MFR_2$(PP2)] is in the range of 1.5 to 80.0, more preferably in the range of 2.0 to 50.0, yet more preferably in the range of 2.5 to 30.0, still more preferably in the range of 3.0 to 20.0, like in the range of 4.0 to 20.0, and optionally
(c) the ratio of the melt flow rate $MFR_2$ (230° C.) of the semicrystalline polypropylene (PP3) to the melt flow rate $MFR_2$ (230° C.) of the semicrystalline polypropylene (PP1) [$MFR_2$(PP3)/$MFR_2$(PP1)] is in the range of 4.5 to 500.0, more preferably in the range of 8.0 to 180.0, yet more preferably in the range of 10.0 to 150.0, still more preferably in the range of 12.0 to 120.0, like in the range of 15.0 to 100.0, Additionally or alternatively to the previous paragraph
(a) the semicrystalline polypropylene (PP1) has a melt flow rate $MFR_2$ (230° C.) measured according to ISO 1133 in the range of 1.0 to 60.0 g/10 min, more preferably in the range of 1.0 to 55.0 g/10 min, still more preferably in the range of 2.0 to 50.0 g/10 min, more preferably in the range of 3.0 to 40.0 g/10 min, still yet more preferably in the range of 8.0 to 30.0 g/10 min, like in the range of 15.0 to 25.0 g/10 min,
(b) said semicrystalline polypropylene (PP2) hast a melt flow rate $MFR_2$ (230° C.) measured according to ISO 1133 in the range of 40.0 to 120 g/10 min, more preferably in the range of 50.0 to 100.0 g/10 min, still more preferably in the range of 55.0 to 95.0 g/10 min, like 56.0 to 95.0 wt.-%, yet more preferably in the range of 60.0 to 90.0 g/10 min, still yet more preferably in the range of 60.0 to 90.0 g/10 min, like in the range of 65.0 to 85.0 g/10 min, and
(c) said semicrystalline polypropylene (PP3) hast a melt flow rate $MFR_2$ (230° C.) measured according to ISO 1133 in the range of 180 to 1,000 g/10 min, more preferably in the range of 200.0 to 800.0 g/10 min, still more preferably in the range of 250.0 to 650.0 g/10 min, yet more preferably in the range of 300.0 to 600.0 g/10 min, still yet more preferably in the range of 350.0 to 550.0 g/10 min, like in the range of 400.0 to 500.0 g/10 min,
with the proviso that the melt flow rate $MFR_2$ (230° C.) of the semicrystalline polypropylene (PP1) is lower than the melt flow rate $MFR_2$ (230° C.) of the semicrystalline polypropylene (PP2).

Still more preferably the weight ratio between the semicrystalline polypropylene (PP2) and the sum of the semicrystalline polypropylenes (PP1) and (PP3) [(PP2)/((PP1)+(PP3))] is in the range of 0.4 to 3.0, e.g. in the range of 0.4 to 3.0, more preferably in the range of 0.5 to 2.6, still more preferably in the range 0.8 to 2.0, yet more preferably in the range of 1.0 to 1.5.

Additionally or alternatively to the previous paragraph, the weight ratio between the semicrystalline polypropylene (PP3) and the semicrystalline polypropylene (PP1) [(PP3)/(PP1)] is preferably in the range of 0.7 to 4.0, more preferably in the range of 0.8 to 3.0, yet more preferably in the range of 0.9 to 2.0, still more preferably in the range of 0.9 to 1.5.

Additionally or alternatively to the two previous paragraphs
(a) the amount of the semicrystalline polypropylenes (PP1), based on the total sum of the semicrystalline polypropylenes (PP1), (PP2), and (PP3), is in the range of 10 to 50 wt.-%, more preferably in the range of 15 to 46 wt.-%, still more preferably in the range of 28 to 30 wt.-%, like in the range of 19 to 25 wt.-%,
(b) the amount of the semicrystalline polypropylenes (PP2), based on the total sum of the semicrystalline polypropylenes (PP1), (PP2), and (PP3), is in the range of 30 to 80 wt.-%, more preferably in the range of 35 to 75 wt.-%, still more preferably in the range of 40 to 75 wt.-%, like in the range of 45 to 70 wt.-%, and
(c) the amount of the semicrystalline polypropylenes (PP3), based on the total sum of the semicrystalline polypropylenes (PP1), (PP2), and (PP3), is in the range of 5 to 45 wt.-%, more preferably in the range of 7 to 35 wt.-%, still more preferably in the range of 10 to 30 wt.-%, like in the range of 15 to 25 wt.-%.

The semicrystalline polypropylenes (PP1), (PP2), and (PP3) can be a random propylene copolymer or a propylene homopolymer, the latter being preferred.

The expression propylene homopolymer used in the instant invention relates to a polypropylene that consists substantially, i.e. of at least 99.5 wt.-%, based on the total weight of the polypropylene, preferably of at least 99.6 wt.-%, more preferably of at least 99.8 wt.-%, of propylene units. In one embodiment of the present invention, only propylene units in the propylene homopolymer are detectable.

If the semicrystalline polypropylenes (PP1), (PP2), and (PP3) are a random polypropylene copolymer (R-PP1), (R-PP2), (R-PP3), it comprises monomers copolymerizable with propylene, i.e. α-olefins other than propylene, for example comonomers such as ethylene and/or $C_4$ to $C_{10}$ α-olefins, in particular ethylene and/or $C_4$ to $C_8$ α-olefins, e.g. 1-butene and/or 1-hexene. Preferably, the random polypropylene copolymer (R-PP1), (R-PP2), (R-PP3) comprises, especially consists of, monomers copolymerizable with propylene from the group consisting of ethylene, 1-butene and 1-hexene. More specifically, the random polypropylene copolymer (R-PP1), (R-PP2), (R-PP3) comprises—apart from propylene—units derivable from ethylene and/or 1-butene. In one embodiment of the present invention, the random polypropylene copolymer (R-PP1), (R-PP2), (R-PP3) comprises units derivable from ethylene and propylene only.

The comonomer content in the random polypropylene copolymer (R-PP1), (R-PP2), (R-PP3) is preferably relatively low, i.e. below 5.0 wt.-% based on the total weight of the random polypropylene copolymer (R-PP1), (R-PP2) and (R-PP3), respectively. In one embodiment of the present invention, the comonomer content is preferably between 0.5 wt.-% and 5.0 wt.-%, more preferably between 0.5 wt.-% and 4.0 wt.-%, based on the total weight of the random polypropylene copolymer (R-PP1), (R-PP2) and (R-PP3), respectively.

It is especially preferred that the semicrystalline polypropylenes (PP2) and (PP3) are semicrystalline propylene homopolymers (H-PP2) and (H-PP3).

The semicrystalline polypropylene (PP2), like the semicrystalline propylene homopolymer (H-PP2), has preferably a melting temperature Tm in the range of 158 to 168° C., like in the range of 160 to 166° C. Accordingly it is preferred that the semicrystalline polypropylene (PP2) is a semicrystalline propylene homopolymer (H-PP2) having a melt flow rate $MFR_2$ (230° C.) measured according to ISO 1133 in the range of 40.0 to 120 g/10 min, more preferably in the range of 50.0 to 100.0 g/10 min, still more preferably in the range of 55.0 to 95.0 g/10 min, yet more preferably in the range of 60.0 to 90.0 g/10 min, still yet more preferably in the range of 60.0 to 90.0 g/10 min, like in the range of 65.0 to 85.0 g/10 min. Such a semicrystalline propylene homopolymer is known in the art. For instance the semicrystalline propylene homopolymer (H-PP2) can be the commercial product HJ120UB of Borealis AG.

The semicrystalline polypropylene (PP3), like the semicrystalline propylene homopolymer (H-PP3), has a rather high melt flow rate and thus is also called high melt flow polypropylene. Accordingly the semicrystalline polypropylene (PP3), like the semicrystalline propylene homopolymer (H-PP3), has the highest melt flow rate of the three semicrystalline polypropylenes (PP1), (PP2) and (PP3). Such high melt flow polymers can be produced directly in a polymerization reactor by well known processes, described in several patent applications (for example in EP 0 320 150, EP 0 480 190, EP 0 622 380, EP 1 303 547, EP 1 538 167, EP 1 783 145, WO 2007/140019, etc.). Alternatively such high melt flow rate polypropylenes can be obtained by controlled rheology (CR) techniques, including, e.g. visbreaking, which means that a polymer, having low melt flow rate, is subjected to a post-reactor treatment, wherein the polymer molecules are subjected to controlled scission in molten state. The scission may be carried out by mechanical shearing, radiation and oxidation or chemically with peroxy compounds. Preferably controlled rheology treatments are carried out using organic peroxides. The process of visbreaking a propylene polymer material is well known to those skilled in the art and is described in several patent applications (for example in U.S. Pat. No. 3,940,379, U.S. Pat. No. 4,951,589, U.S. Pat. No. 4,282,076, U.S. Pat. No. 5,250,631, EP 0 462 574, WO 02/096986, WO 2004/113438, etc.). The polymer used as starting compound for the controlled rheology treatment may be produced by any polymerisation process known in the art. The polymerisation process may be a continuous process or a batch process utilising known methods and operating in liquid phase, optionally in the presence of an inert diluent, or in gas phase or by mixed liquid-gas techniques. The process is preferably carried out in the presence of a stereospecific catalyst system. As catalyst any ordinary stereospecific Ziegler-Natta catalysts or any metallocene catalyst capable of catalysing the formation of a propylene polymer can be used. The thus produced polypropylene is featured by high melt flow. Accordingly it is preferred that the semicrystalline polypropylene (PP3), like the semicrystalline propylene homopolymer (H-PP3), hast a melt flow rate $MFR_2$ (230° C.) measured according to ISO 1133 in the range of 180 to 1,000 g/10 min, more preferably in the range of 200.0 to 800.0 g/10 min, still more preferably in the range of 250.0 to 650.0 g/10 min, yet more preferably in the range of 300.0 to 600.0 g/10 min, still yet more preferably in the range of 350.0 to 550.0 g/10 min, like in the range of 400.0 to 500.0 g/10 min. Such high melt flow polymers are known in the art. For instance the semicrystalline propylene homopolymer (H-PP2) can be the commercial product HL504FB of Borealis AG.

The semicrystalline polypropylene (PP1) has the lowest melt flow rate of the three semicrystalline polypropylenes (PP1), (PP2) and (PP3). Preferably the semicrystalline polypropylene (PP1) is the polymer which is α-nucleated and thus triggers the α-nucleation of the other polymers as well.

The semicrystalline polypropylene (PP1) can be a semicrystalline random propylene copolymer (R-PP1) or a semicrystalline propylene homopolymer (H-PP1), the latter being preferred.

The semicrystalline propylene homopolymer (H-PP1) is known in the art. Preferably the semicrystalline propylene homopolymer (H-PP1) has a melt flow rate $MFR_2$ (230° C.) measured according to ISO 1133 in the range of 1.0 to 60.0 g/10 min, more preferably in the range of 1.0 to 55.0 g/10 min, still more preferably in the range of 2.0 to 50.0 g/10 min, yet more preferably in the range of 3.0 to 40.0 g/10 min, still yet more preferably in the range of 10.0 to 30.0 g/10 min, like in the range of 15.0 to 25.0 g/10 min. For instance the semicrystalline propylene homopolymer (H-PP1) can be the commercial product HF955MO of Borealis AG. This commercial product is α-nucleated due to the presence of polyvinyl cyclohexane (polyVCH).

In case the semicrystalline polypropylene (PP1) is the semicrystalline random propylene copolymer (R-PP1) the comonomer content in the semicrystalline random polypropylene copolymer (R-PP1) is preferably relatively low, i.e. below 5.0 wt.-% based on the total weight of the semicrystalline random polypropylene copolymer (R-PP1). In one embodiment of the present invention, the comonomer content is preferably between 0.5 wt.-% and 5.0 wt.-%, more preferably between 0.5 wt.-% and 4.0 wt.-%, based on the total weight of the semicrystalline random polypropylene copolymer (R-PP1). Preferably the semicrystalline random polypropylene copolymer (R-PP1) comprises monomers copolymerizable with propylene, i.e. α-olefins other than propylene, for example comonomers such as ethylene and/or $C_4$ to $C_{10}$ α-olefins, in particular ethylene and/or $C_4$ to $C_8$ α-olefins, e.g. 1-butene and/or 1-hexene. Preferably, the semicrystalline random polypropylene copolymer (R-PP1) comprises, especially consists of, monomers copolymerizable with propylene from the group consisting of ethylene, 1-butene and 1-hexene. More specifically, the semicrystalline random polypropylene copolymer (R-PP1) comprises—apart from propylene—units derivable from ethylene and/or 1-butene. In one embodiment of the present invention, the semicrystalline random polypropylene copolymer (R-PP1) comprises units derivable from ethylene and propylene only.

In one specific embodiment the polypropylene composition (PPC) is monophasic and comprises the semicrystalline polypropylenes (PP1), (PP2), and (PP3).

The term "monophasic" indicates that the polypropylene composition (PPC) does not contain elastomeric (co)polymers forming inclusions as a second phase for improving mechanical properties of the composite, such as elongation at break. A polymer phase containing elastomeric (co) polymers as insertions of a second phase would by contrast be called heterophasic and is not part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures. Hence in a preferred embodiment of the present invention such fiber reinforced composites are preferably excluded from the present invention. Thus as mentioned above the fiber reinforced composite according to the instant invention preferably comprises a monophasic polymer matrix, i.e. the monophasic polypropylene composition (PPC), in which are the fibers (F) are dispersed.

Accordingly it is preferred that the monophasic polypropylene composition (PPC) according to this invention has no glass transition temperature below −30, preferably below −25° C., more preferably below −20° C.

On the other hand, in one preferred embodiment the monophasic polypropylene composition (PPC) according to this invention has a glass transition temperature in the range of −12 to +8° C., more preferably in the range of −10 to +8° C.

Accordingly, in a specific preferred embodiment the polypropylene composition (PPC) is monophasic and comprises the semicrystalline polypropylenes (PP1), (PP2), and (PP3) as the only semicrystalline polymers, e.g. the semicrystalline polypropylenes (PP1), (PP2), and (PP3) make up at least 80 wt.-%, more preferably at least 90 wt.-%, like at least 95 wt.-% of the polypropylene composition (PPC). In still a more preferred embodiment the polypropylene composition (PPC) is monophasic and comprises the semicrystalline propylene homopolymers (H-PP1), (H-PP2) and (H-PP3). In a very specific embodiment the polypropylene composition (PPC) is monophasic and comprises the semicrystalline propylene homopolymers (H-PP1), (H-PP2) and (H-PP3) as the only semicrystalline polymers, e.g. the semicrystalline propylene homopolymers (H-PP1), (H-PP2) and (H-PP3) make up at least 80 wt.-%, more preferably at least 90 wt.-%, like at least 95 wt.-% of the polypropylene composition (PPC). For instance in a particular preferred embodiment the polypropylene composition (PPC) is monophasic and consists of the semicrystalline propylene homopolymers (H-PP1), (H-PP2) and (H-PP3). In another preferred embodiment the polypropylene composition (PPC) is monophasic and comprises semicrystalline random propylene copolymer (R-PP1) as well as the semicrystalline propylene homopolymers (H-PP2) and (H-PP3). Preferably the polypropylene composition (PPC) is monophasic and comprises the semicrystalline propylene homopolymers (H-PP2) and (H-PP3) and the semicrystalline random propylene copolymer (R-PP1) as the only semicrystalline polymers, e.g. the semicrystalline propylene homopolymers (H-PP2) and (H-PP3) and the semicrystalline random propylene copolymer (R-PP1) make up at least 80 wt.-%, more preferably at least 90 wt.-%, like at least 95 wt.-% of the polypropylene composition (PPC).

Thus in one specific embodiment of the invention the polypropylene composition (PPC) is monophasic and comprises (a) 5 to 40 wt.-%, more preferably in the range of 7 to 35 wt.-%, still more preferably in the range of 10 to 30 wt.-%, like in the range of 15 to 25 wt.-%, of the semicrystalline propylene homopolymer (H-PP1), based on the total weight of the polypropylene composition (PPC), wherein said the semicrystalline propylene homopolymer (H-PP1) has a melt flow rate $MFR_2$ (230° C.) measured according to ISO 1133 in the range of 1.0 to 40.0 g/10 min, more preferably in the range of 10.0 to 40.0 g/10 min, still more preferably in the range of 15.0 to 30.0 g/10 min, yet more preferably in the range of 18.0 to 25.0 g/10 min, (b) 30 to 80 wt.-%, more preferably in the range of 35 to 75 wt.-%, still more preferably in the range of 40 to 75 wt.-%, like in the range of 45 to 70 wt.-%, of the semicrystalline propylene homopolymer (H-PP2), based on the total weight of the polypropylene composition (PPC), wherein said the semicrystalline propylene homopolymer (H-PP2) has melt flow rate $MFR_2$ (230° C.) measured according to ISO 1133 in the range of 40.0 to 120 g/10 min, more preferably in the range of 50.0 to 100.0 g/10 min, still more preferably in the range of 55.0 to 95.0 g/10 min, yet more preferably in the range of 60.0 to 90.0 g/10 min, still yet more preferably in the range of 60.0 to 90.0 g/10 min, like in the range of 65.0 to 85.0 g/10 min., and (c) 10 to 50 wt.-%, more preferably in the range of 15 to 46 wt.-%, still more preferably in the range of 28 to 30 wt.-%, like in the range of 19 to 25 wt.-%, of the semicrystalline propylene homopolymer (H-PP3), based on the total weight of the polypropylene composition (PPC), wherein said the semicrystalline propylene homopolymer (H-PP3) has melt flow rate $MFR_2$ (230° C.) measured according to ISO 1133 in the range of 180 to 1,000 g/10 min, more preferably in the range of 200.0 to 800.0 g/10 min, still more preferably in the range of 250.0 to 650.0 g/10 min, yet more preferably in the range of 300.0 to 600.0 g/10 min, still yet more preferably in the range of 350.0 to 550.0 g/10 min, like in the range of 400.0 to 500.0 g/10 min.

Such a monophasic polypropylene composition (PPC) is preferably obtained by mechanically blending the semicrystalline polypropylenes (PP1), (PP2) and (PP3), like the semicrystalline propylene homopolymers (H-PP1), (H-PP2) and (H-PP3).

The Fibers (F)

Essential components of the present fiber reinforced composite are the fibers (F).

Preferably the fibers (F) are selected from the group consisting of glass fibers, metal fibers, mineral fibers, ceramic fibers, carbon fibers and graphite fibers. Glass fibers are preferred. In particular, the glass fibers are cut glass fibers, also known as short fibers or chopped strands.

The cut or short glass fibers (F) used in the fiber reinforced composition preferably have an average length in the range of from 1 to 10 mm, more preferably in the range of 2 to 8 mm, still more preferably in the range of 3 to 5 mm, like in the range of 3.0 to 4.5 mm.

The cut or short glass fibers used in the fiber reinforced composition preferably have an average diameter of from 8 to 20 μm, more preferably from 9 to 16 μm, for example 9 to 14 μm.

Preferably, the fibers (F) have an aspect ratio of 125 to 650, preferably of 150 to 450, more preferably 200 to 440, still more preferably 300 to 430. The aspect ratio is the relation between average length and average diameter of the fibers.

The Adhesion Promotor (AP)

To improve compatibility between the polypropylene composition (PPC) and the fibers (F) preferably an adhesion promotor (AP) is used.

The adhesion promotor (AP) preferably comprises, more preferably is, a modified (functionalized) polyolefin, like a modified (functionalized) polypropylene. Modified α-olefin polymers, in particular propylene homopolymers and copolymers, like propylene copolymers of propylene and ethylene, are most preferred, as they are highly compatible with the polypropylene composition (PPC) of the fiber reinforced composite. Modified polyethylene can be used as well but is less preferred.

In terms of structure, the modified (functionalized) polyolefin, like a modified (functionalized) polypropylene, is preferably selected from graft or block copolymers.

In this context, preference is given to a modified (functionalized) polyolefin, like a modified (functionalized) polypropylene, containing groups deriving from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of the said polar compounds are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, maleic acid, fumaric acid, itaconic acid and mixtures thereof.

Particular preference is given to using a propylene polymer, e.g. a propylene homopolymer, grafted with maleic anhydride as the modified polymer, i.e. the adhesion promotor (AP).

The modified (functionalized) polyolefin, like the modified (functionalized) polypropylene, i.e. the adhesion promotor (AP), can be produced in a simple manner by reactive extrusion of the polymer, for example with maleic anhydride in the presence of free radical generators (like organic peroxides), as disclosed for instance in EP 0 572 028.

Preferred amounts of groups deriving from polar compounds in the modified (functionalized) polyolefin, like the modified (functionalized) polypropylene, i.e. the adhesion promotor (AP), are from 0.5 to 4% by weight.

Preferred values of the melt flow rate $MFR_2$ (230° C.) for the modified polymer, i.e. for the modified (functionalized) polyolefin, like for the modified (functionalized) polypropylene, i.e. for the adhesion promotor (AP), are from 1.0 to 500 g/10 min.

The Additives (AD)

The polypropylene composition (PPC) and thus also the fiber reinforced composite may comprise additives (AD). Typical additives are acid scavengers, antioxidants, colorants, light stabilisers, heat stabilisers, anti-scratch agents, processing aids, lubricants, pigments, and the like. Accordingly in one embodiment the additives (AD) are selected from the group consisting of acid scavengers, antioxidants, colorants, light stabilisers, heat stabilisers, anti-scratch agents, processing aids, lubricants and pigments. Such additives are commercially available and for example described in "Plastic Additives Handbook", 6$^{th}$ edition 2009 of Hans Zweifel (pages 1141 to 1190). According to this invention α-nucleating agents are not be regarded as additives (AD) and discussed separately.

Furthermore, the term "additives (AD)" according to the present invention also includes carrier materials, in particular polymeric carrier materials, but does not include α-nucleating agents which are separately discussed.

The polymeric carrier material is a carrier polymer for the additives (AD) to ensure a uniform distribution in the polypropylene composition (PPC). The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

According to a preferred embodiment the polymeric carrier material is a polypropylene homopolymer.

For mixing the individual components of the instant fiber reinforced composite, a conventional compounding or blending apparatus, e.g. a Banbury mixer, a 2-roll rubber mill, Buss-co-kneader or a twin screw extruder may be used. Preferably, mixing is accomplished in a co-rotating twin screw extruder. The fiber reinforced composite recovered from the extruder are usually in the form of pellets. These pellets are then preferably further processed, e.g. by injection molding to generate articles and products of the inventive fiber reinforced composition.

The Article

The present invention also relates to an injection molded article, like an injection molded automotive article, comprising the fiber reinforced composition as defined above. The present invention in particular relates to an injection molded article, like an injection molded automotive article, comprising at least 60 wt.-%, more preferably at least 80 wt.-%, still more preferably at least 90 wt.-%, like at least 95 wt.-% or at least 99 wt.-%, of the fiber reinforced composition as defined above. In an especially preferred embodiment the present invention relates to an injection molded article, like an injection molded automotive article, consisting of the fiber reinforced composition as defined above.

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy is used to quantify the isotacticity and regio-regularity of the polypropylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For polypropylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}C\{^1H\}$ NMR spectra were processed, integrated and relevant quantitative properties determined from the integrals using proprietary computer programs.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443;

Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio-defects:

$P_{total}=P_{12}+P_{12e}$

The mole percent of 2,1-erythro regio-defects was quantified with respect to all propene:

[21e]mol.-%=100*($P_{21e}/P_{total}$)

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction.

The weight percent comonomer incorporation was calculated from the mole fraction.

The density is measured according to ISO 1183-1-method A (2004). Sample preparation is done by compression moulding in accordance with ISO 1872-2:2007.

$MFR_2$ (230° C.) is measured according to ISO 1133 (230° C., 2.16 kg load).

$MFR_2$ (190° C.) is measured according to ISO 1133 (190° C., 2.16 kg load).

Melting temperature ($T_m$): measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Melting temperature is determined from the second heating step.

The glass transition temperature Tg is determined by dynamic mechanical analysis according to ISO 6721-7. The measurements are done in torsion mode on compression moulded samples (40×10×1 mm³) between −100° C. and +150° C. with a heating rate of 2° C./min and a frequency of 1 Hz.

The xylene cold solubles (XCS) content is determined at 25° C. according to ISO 16152; first edition; 2005-07-01

Tensile Modulus; Tensile stain at break; are measured according to ISO 527-2 (cross head speed=50 mm/min for measurement of strain at break, and 1 mm/min for Tensile Modulus; 23° C.) using injection molded specimens as described in EN ISO 1873-2 (dog bone shape, 4 mm thickness).

Charpy impact test: The Charpy (notched) impact strength (Charpy NIS/IS) is measured according to ISO 179 1eA at 23° C., using injection molded bar test specimens of 80×10×4 mm prepared in accordance with ISO 294-1:1996.

The glass transition temperature Tg is determined by dynamic mechanical analysis according to ISO 6721-7. The measurements are done in torsion mode on compression moulded samples (40×10×1 mm³) between −100° C. and +150° C. with a heating rate of 2° C./min and a frequency of 1 Hz.

Spiral flow length: This method specifies a principle to test, by use of injection moulding, the flowability of a plastic material taking into consideration the cooling effect of the mould. Plastic is melted down and plasticized by a screw in a warm cylinder. Melted plastic is injected by the screw function as a piston, into a cavity with a certain speed and pressure. The cavity is shaped as a spiral with a divided scale for length measurement printed in the steel. That gives the possibility to read the flow length directly on the injection moulded test spiral specimen.

Spiral Test was carried out using an Engel ES 1050/250 HL injection molding apparatus with a spiral mould and pressure of 600, 1000 or 1400 bar screw diameter: 55 mm spec. injection pressure: 600, 1000, or 1400 bar tool form: round, spiral form; length 1545 mm; profile: trapeze 2.1 mm thickness; cross sectional area 20.16 mm² temperature in pre-chamber and die: 230° C.

temperature in zone 2/zone 3/zone 4/zone 5/zone 6: 230° C./230° C./220° C./220° C./200° C.

injection cycle: injection time including holding: 6 s cooling time: 10 s screw speed: 50 mm/sec tool temperature: 40° C.

The spiral flow length can be determined immediately after the injection operation.

Grey value determination The image recording part of an optical measurement system, as described by Sybille Frank et al. in PPS 25 Intern. Conf. Polym. Proc. Soc 2009 or Proceedings of the SPIE, Volume 6831, pp 68130T-68130T-8 (2008) developed for flow mark evaluation was used together with a specific image analysis and evaluation strategy for characterizing the surface quality.

This method consists of two aspects:

1. Image recording:

The basic principle of the measurement system is to illuminate the plates with a defined light source (LED) in a closed environment and to record an image with a CCD-camera system. The exposure time is calibrated by a grey reference plate (set to a grey value of 140) in order to compensate for changes in the lighting and/or the camera.

2. Image analysis:

The specimen is floodlit from one side and the upwards reflected portion of the light is deflected via two mirrors to a CCD-sensor. Several such created grey value images are averaged and smoothed and consequently analysed in terms of the measured grey value distribution.

Generally the grey scale distribution curve of a sample measured from a 188*50 mm image (approx. 77250 pixels) is reported showing the sum of pixels with the same grey value over the range of grey values with low grey values for dark on the left side and high grey values for bright pixels on the right side of the chart. The start of the distribution curve is defined as first, darkest grey value with 25 pixel, the maximum of the distribution curve is defined as the grey value with the maximum of pixels and the end of the distribution curve is defined with the last, brightest grey value with as well 25 pixel.

Target for the development of a good sample material is to have the maximum as far left at the dark end of the grey scale and an as low as possible grey values distribution, in specific a small difference between the maximum and the bright end of the grey scale distribution curve.

For this evaluation plaques 210×148×3 mm³ with smooth surface and a film gate of 1.4 mm were used and were produced with a filling time of 1.5 sec.

Further conditions:
Melt temperature: 255° C. for PP-LGF, 250° C. for PP-SGF
Mould temperature 55° C. for PP-LGF, 40° C. for PP-SGF
Dynamic pressure: 1 bar hydraulic
Fiber diameter is determined according to ISO 1888:2006 (E), Method B, microscope magnification of 1000.

2. Examples

The present invention is illustrated by the following examples:

TABLE 1a

| Comparative examples | | | | |
|---|---|---|---|---|
| | | CE1 | CE2 | CE3 |
| H-PP1 | [wt.-%]* | — | — | 47.35 |
| H-PP2 | [wt.-%]* | — | 47.35 | — |
| H-PP3 | [wt.-%]* | 47.35 | — | — |
| AP | [wt.-%]* | 2 | 2 | 2 |
| GF1 | [wt.-%]* | 50 | 50 | 50 |

*rest to 100 wt.-% are additives in usual levels, including polymeric carrier material, antioxidants, and UV-stabilizer.

TABLE 1b

| Inventive examples | | | |
|---|---|---|---|
| | | IE1 | IE2 |
| H-PP1 | [wt.-%]* | 10 | 10 |
| H-PP2 | [wt.-%]* | 26.45 | 26.45 |
| H-PP3 | [wt.-%]* | 10 | 10 |
| AP | [wt.-%]* | 2 | 2 |
| GF1 | [wt.-%]* | — | 50 |
| GF2 | [wt.-%]* | 50 | — |

*rest to 100 wt.-% are additives in usual levels, including polymeric carrier material, antioxidants, and UV-stabilizer.

H-PP1 is the commercial propylene homopolymer HF955MO of Borealis AG having a melt flow rate MFR$_2$ (230° C.) of 20 g/10 min, a density of 908 kg/m³ and a glass transition temperature Tg of +4° C. The propylene homopolymer HF955MO is α-nucleated with polyvinyl cyclohexane (polyVCH).

H-PP2 is the commerical propylene homopolymer HJ120UB of Borealis AG having a melt flow rate MFR$_2$ (230° C.) of 75 g/10 min, a density of 905 kg/m³ and a glass transition temperature Tg of +2° C.

H-PP3 is the commerical high flow propylene homopolymer HL504FB of Borealis AG having a melt flow rate MFR$_2$ (230° C.) of 450 g/10 min and a glass transition temperature Tg of +0° C.

AP is the commercial maleic anhydride functionalized polypropylene "Scona TPPP 8112 FA" of Kometra GmbH, Germany with a density of 0.9 g/cm³, having an MFR$_2$ (190° C.) of approximately 96 g/10 min and an MAH content of 1.4 wt.-%.

GF1 is the commercial product ECS 03 T-480H of Nippon Electric Glass Co., Ltd. having a filament diameter of 10.5 μm and a strand length of 3 mm.

GF2 is the commercial glass fiber "Thermo Flow Chopped Strand 636 for PP" of Johns Manville, which are E-glass fibers coated with a silane based sizing, an average length of 4 mm, and an average diameter of 13 μm.

TABLE 2a

| Properties of the comparative examples | | | | |
|---|---|---|---|---|
| | | CE1 | CE2 | CE3 |
| MFR | [g/10 min] | 4.7 | 2.5 | 0.7 |
| SFL | [mm] | n.d. | n.d. | 406 |
| TM | [MPa] | 13274 | 13376 | 13897 |
| TS | [%] | 153 | 162 | 162 |
| Impact | [kJ/m²] | 16.8 | 15.8 | 14.7 |

TABLE 2b

| Properties of the inventive examples | | | |
|---|---|---|---|
| | | IE1 | IE2 |
| MFR | [g/10 min] | 4.3 | 2.3 |
| SFL | [mm] | 567 | 559 |
| TM | [MPa] | 12984 | 13196 |
| TS | [%] | 150 | 157 |
| Impact | [kJ/m²] | 12.8 | 13.2 |

SFL is the spiral flow length (230°/40°) at 600 bar
TM is the tensile modulus
TS is the tensile strength
n.d. not determined

What is claimed is:

1. A fiber reinforced composite comprising
   (a) a monophasic polypropylene composition (PPC),
   (b) fibers (F),
   (c) a polar modified polypropylene as adhesion promotor (AP),
   wherein said monophasic polypropylene composition (PPC) comprises at least three semicrystalline polypropylenes (PP1), (PP2), (PP3),
   (a1) said semicrystalline polypropylene (PP1) has a melt flow rate MFR$_2$ (230° C.) measured according to ISO 1133 in the range of 1.0 to 60.0 g/10 min,
   (a2) said semicrystalline polypropylene (PP2) has a melt flow rate MFR$_2$ (230° C.) measured according to ISO 1133 in the range of 40 to 120 g/10 min, and (a3) said semicrystalline polypropylene (PP3) has a melt flow rate $MFR_2$ (230° C.) measured according to ISO 1133 in the range of 180 to 1,000 g/10 min, with the proviso that the melt flow rate $MFR_2$ (230° C.) of the semicrystalline polypropylene (PP1) is lower than the melt flow rate $MFR_2$ (230° C.) of the semicrystalline polypropylene (PP2).

2. The fiber reinforced composite according to claim 1, wherein
(a) said semicrystalline polypropylene (PP1) has a melt flow rate $MFR_2$ (230° C.) measured according to ISO 1133 in the range of 1.0 to 55 g/10 min, and
(b) said semicrystalline polypropylene (PP2) has a melt flow rate $MFR_2$ (230° C.) measured according to ISO 1133 in the range of 56 to 120 g/10 min.

3. The fiber reinforced composite according to claim 1, wherein said composite comprises
(a) 29.0 to 60.0 wt.-%, based on the fiber reinforced composite, of the monophasic polypropylene composition (PPC),
(b) 39.0 to 70.0 wt.-%, based on the fiber reinforced composite, of fibers (F), and
(c) 0.5 to 5.0 wt.-%, based on the fiber reinforced composite, of the polar modified polypropylene as adhesion promotor (AP).

4. The fiber reinforced composite according to claim 1, wherein
(a) the weight ratio between the fibers (F) and the polypropylene composition (PPC) [(F)/(PPC)] is in the range of 0.7 to 2.0, or
(b) the weight ratio between the fibers (F) and the polar modified polypropylene is in the range of 10 to 50, or
(c) the weight ratio between the fibers (F) and the monophasic polypropylene composition (PPC) [(F)/(PPC)] is in the range of 0.7 to 2.0 and the weight ratio between the fibers (F) and the polar modified polypropylene is in the range of 10 to 50.

5. The fiber reinforced composite according to claim 1, wherein the monophasic polypropylene composition (PPC) is α-nucleated.

6. The fiber reinforced composite according to claim 1, wherein
(a) the monophasic polypropylene composition (PPC) has a melt flow rate $MFR_2$ (230° C.) measured according to ISO 1133 in the range of 25 to 165 g/10 min, or
(b) the reinforced composite has a melt flow rate $MFR_2$ (230° C.) measured according to ISO 1133 in the range of 1.0 to 10 g/10 min, or
(c) the monophasic polypropylene composition (PPC) has a melt flow rate $MFR_2$ (230° C.) measured according to ISO 1133 in the range of 25 to 165 g/10 min and the reinforced composite has a melt flow rate $MFR_2$ (230° C.) measured according to ISO 1133 in the range of 1.0 to 10 g/10 min.

7. The fiber reinforced composite according to claim 1, wherein
(a) the weight ratio between the semicrystalline polypropylene (PP2) and the sum of the semicrystalline polypropylenes (PP1) and (PP3) [(PP2)/((PP1)+(PP3))] is in the range of 0.4 to 3.0, or
(b) the weight ratio between the semicrystalline polypropylene (PP3) and the semicrystalline polypropylenes (PP1) [(PP3)/(PP1)] is in the range of 0.5 to 4.0, or (c) the weight ratio between the semicrystalline polypropylene (PP2) and the sum of the semicrystalline polypropylenes (PP1) and (PP3) [(PP2)/((PP1)+(PP3))] is in the range of 0.4 to 3.0 and the weight ratio between the semicrystalline polypropylene (PP3) and the semicrystalline polypropylenes (PP1) [(PP3)/(PP1)] is in the range of 0.5 to 4.0.

8. The fiber reinforced composite according to claim 1, wherein the semicrystalline polypropylenes (PP1), (PP2), (PP3) are propylene homopolymers (H-PP1), (H-PP2), (H-PP3).

9. The fiber reinforced composite according to claim 1, wherein the semicrystalline polypropylene (PP2) and (PP3) are propylene homopolymers (H-PP2) and (H-PP3), whereas the semicrystalline polypropylene (PP1) is a propylene copolymer (R-PP1).

10. The fiber reinforced composite according to claim 1, wherein the fibers (F) are selected from the group consisting of glass fibers, metal fibers, ceramic fibers, carbon fibers and graphite fibers.

11. The fiber reinforced composite according to claim 1, wherein the fibers (F) have an average diameter of 5.0 to 20.0 μm.

12. The fiber reinforced composite according to claim 1, wherein the fibers (F) have an average length of 2 to 8 mm.

13. The fiber reinforced composite according to claim 1, wherein the adhesion promotor (AP) is a maleic anhydride functionalized polypropylene.

14. An injection molded article comprising a fiber reinforced composite comprising
(a) a monophasic polypropylene composition (PPC),
(b) fibers (F),
(c) a polar modified polypropylene as adhesion promotor (AP),
wherein said monophasic polypropylene composition (PPC) comprises at least three semicrystalline polypropylenes (PP1), (PP2), (PP3),
(a1) said semicrystalline polypropylene (PP1) has a melt flow rate $MFR_2$ (230° C.) measured according to ISO 1133 in the range of 1.0 to 60.0 g/10 min,
(a2) said semicrystalline polypropylene (PP2) has a melt flow rate $MFR_2$ (230° C.) measured according to ISO 1133 in the range of 40 to 120 g/10 min, and
(a3) said semicrystalline polypropylene (PP3) has a melt flow rate $MFR_2$ (230° C.) measured according to ISO 1133 in the range of 180 to 1,000 g/10 min,
with the proviso that the melt flow rate $MFR_2$ (230° C.) of the semicrystalline polypropylene (PP1) is lower than the melt flow rate $MFR_2$ (230° C.) of the semicrystalline polypropylene (PP2).

15. The injection molded article according to claim 14, wherein the article is an automotive article.

16. The fiber reinforced composite according to claim 4, wherein the weight ratio between the fibers (F) and the monophasic polypropylene composition (PPC) [(F)/(PPC)] is in the range of 0.7 to 2.0 with the proviso that the sum of the fibers (F) and the monophasic polypropylene composition (PPC) in the fiber reinforced composite is at least 80 wt.-% based on the total weight of the fiber reinforced composite.

17. The fiber reinforced composite according to claim 10, wherein the fibers (F) are glass fibers.

* * * * *